E. W. CLARK.
PHOTOGRAPHY.
APPLICATION FILED MAY 26, 1920.
1,429,715.
Patented Sept. 19, 1922.
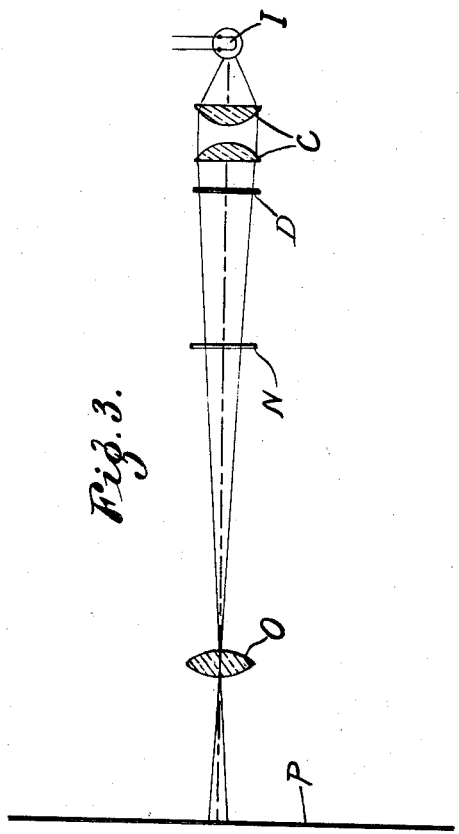
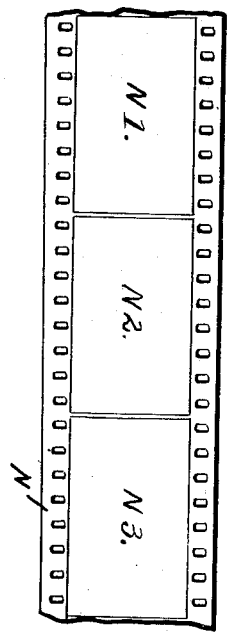
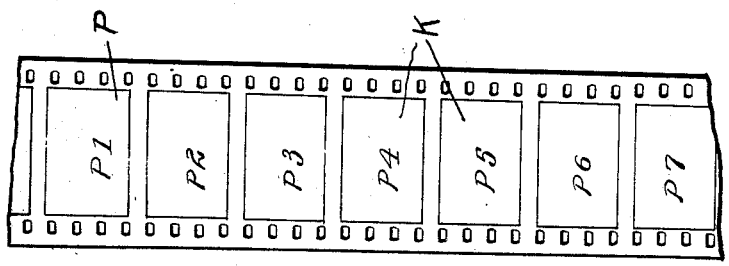
Inventor:
Edwin W. Clark,
By Deloz G. Haynes
Att'y Patented Sept. 19, 1922.

1,429,715

UNITED STATES PATENT OFFICE.

EDWIN W. CLARK, OF CHICAGO, ILLINOIS.

PHOTOGRAPHY.

Application filed May 26, 1920. Serial No. 384,416.

*To all whom it may concern:*

Be it known that I, EDWIN W. CLARK, a citizen of the United States, and a resident of Chicago, in the county of Cook and State of Illinois, have invented an Improvement in Photography, of which the following is a specification.

This invention relates to photography, and with regard to certain more specific features, to a motion-picture film. This application is a continuation in part of my application for patent on photography, Serial Number 279,085, filed February 25, 1919.

The principal object of the present invention is the provision of a new and improved film of standard size, with pictures thereon positioned in standard direction and of standard spacing. Other objects will be in part obvious and in part pointed out hereinafter.

The invention accordingly, consists in the features of construction and arrangements of parts which will be exemplified in the structure hereinafter described and the scope of the application of which will be indicated in the following claims.

In the accompanying drawings, in which is illustrated one of various possible embodiments of the invention.

Figure 1 is a face view of a positive film.

Figure 2 is a face view of a negative film.

Figure 3 is a diagrammatic sectional elevation of a preferred form of printing apparatus.

Similar reference characters indicate corresponding parts throughout the several views of the drawings.

Referring now more particularly to Fig. 1, there is shown a film P of standard size, standard spacing (that is, measuring center to center lengthwise of the film) of sprocket apertures and standard spacing of pictures K. The pictures are arranged in standard direction, that is with the height of the pictures lengthwise of the film; the width of the pictures is preferably substantially equal to the width of standard pictures; the height, due to the ratio of height to width in the preferred form of negative as hereinafter described is preferably somewhat less than the height of standard pictures; so that the area of the positive pictures is a little less than, but substantially equal to, the area of standard pictures.

The film P is adapted to be projected through a standard projector, the only alteration necessary being the provision of adequate illumination and magnification and an aperture of proper size. The area of the projected picture, however, is preferably larger than the area of the usual projected picture as is explained hereinafter.

The preferred form of sensitized film as shown in Fig. 2, is of standard size, and is adapted to be so mounted in a camera that the picture area is substantially twice the area of the pictures $P^1$, $P^2$, etc., on the positive film. For this purpose I prefer to employ a camera using standard film N, but taking the pictures $N^1$, $N^2$, etc., in such manner that their width is lengthwise of the film and their height transverse of the film as indicated in Fig. 2, the width being substantially twice the height of standard pictures and the height being substantially equal to the width of standard pictures, so that the picture area on the negative film is substantially twice the area of standard pictures, and substantially twice the area of the pictures $P^1$, $P^2$, etc., on the positive film. It will be seen that in this negative film the spacing of pictures along the film is twice the standard spacing. Using the standard spacing of four sprocket holes per picture in the positive film as indicated in Fig. 1, the spacing in the negative film Fig. 2, is shown as eight sprocket holes per picture. The camera having a film feed of eight sprocket holes and adapted to take pictures arranged as indicated in Fig. 2, may be of any suitable type and is not illustrated herein as it forms per se no feature of the present invention.

I prefer to make the positive P from the negative either directly by the method and apparatus set forth in said application or with additional steps of printing. For example, the film of the present invention may be produced from a negative N by said method or apparatus, or it may be produced by contact printing from a negative which was produced by said method or apparatus from a positive which in turn was made by contact printing from the negative N taken in the camera. Said method and apparatus may be understood, by way of specific example, from the accompanying drawings, in which a source of illumination I (Fig. 3) is shown as sending rays through condensers C, diffuser D, negative film N and objective O where the rays are focused upon the positive film P, the parts being so positioned that the negative film moves in a horizontal direction at right angles to the plane of the paper at a feed of eight sprocket holes (twice the standard feed), while the positive film P moves in a vertical direction parallel to the plane of the paper at the standard feed of four sprocket holes; and the objective is so located as to form the positive image on an area substantially equal to (in this instance eight-ninths of) the area of standard pictures, and substantially one-half (in this instance four-ninths) the area of the pictures on the negative film N.

The positive film is thus, preferably, made from a negative containing pictures of about twice the area of the positive pictures. From this it follows that the characters on the positive pictures will be smaller than they are on the negative.

In projecting the (positive) film of the present invention onto a screen, in order that the characters may be of usual height, the magnification should be such that the projected picture has about twice the usual area, which means that the screen should have about twice the usual area.

The film of the present invention differs from prior art film photographed with a camera having a lens of the same focal length. For example, the pictures on the former, if photographed from the same view-point as the latter pictures, embrace a greater angle of view. In the embodiment herein illustrated the negative pictures $N^1$, $N^2$, etc., are half again the width of standard negative pictures, so that the horizontal angle embraced by the former is fifty per cent greater than with the latter. Similarly the one-third greater height of the negative pictures $N^1$, $N^2$, etc., as compared with standard negative pictures, means that the former embrace a vertical angle one-third greater than is embraced by standard negative pictures. Again, if the pictures of the present invention and standard pictures are taken from such view-points that the width of field (at the plane of action) in both positives is the same, the camera used for the former is closer (in this instance one-third closer) to the plane of action than the camera used for the latter; and this closer proximity of the camera to the plane of action produces, in scenes having any depth whatever, a greater width of vision in the background, a less width of vision in the foreground, and a greater fore-shortening or perspective, and gives to the spectator a sense of being nearer to the plane of action. Thus the pictures on the film of the present invention have greater contents than pictures taken in the standard way.

The term plane of action is used herein as indicating the plane, perpendicular to the optical axis, in which the principal action takes place, or would take place. The term foreground indicates the space between the camera and the plane of action. By background is meant the space behind the plane of action.

In view of the above, it will be seen that the several objects of the invention are achieved and other advantageous results obtained.

As various possible embodiments might be made of the above invention and as various changes might be made in the embodiments above set forth, it is to be understood that all matter herein set forth or shown in the accompanying drawings is to be interpreted as illustrative and not in a limiting sense.

I claim:

1. A moving-picture film of standard size, standard picture spacing, and standard arrangement of pictures, having pictures thereon of substantially standard area; said pictures having been taken closer to the plane of principal action and having greater width of said plane, than pictures taken of the same subject in the standard way and using a lens of the same focal length.

2. A moving-picture film of standard size, standard picture spacing, and standard arrangement of pictures, having pictures thereon of substantially standard size; said pictures having greater contents than pictures taken of the same subject in the standard way and using a lens of the same focal length.

3. A moving-picture film of standard size, standard picture spacing, and standard arrangement of pictures, having pictures thereon of substantially standard size; said pictures having substantially twice the contents of pictures taken from the same viewpoint, of the same subject, in the standard way and using a lens of the same focal length.

4. A moving-picture film of standard size, standard picture spacing, and standard arrangement of pictures, having pictures thereon of substantially standard size; said pictures having substantially half again the width of field at the plane of principal action, as compared with pictures taken from the same view-point, of the same subject, in the standard way and using a lens of the same focal length.

In testimony whereof, I have signed my name to this specification this 22nd day of May, 1920.

EDWIN W. CLARK.